United States Patent

Dombrowski

[11] Patent Number: 6,087,014
[45] Date of Patent: Jul. 11, 2000

[54] OPTICAL COATINGS OF MEDIUM REFRACTIVE INDEX

[75] Inventor: Reiner Dombrowski, Höchst, Germany

[73] Assignee: Merck Patent Gesellschaft mit beschrankter Haftung, Germany

[21] Appl. No.: 08/623,780

[22] Filed: Mar. 29, 1996

[30] Foreign Application Priority Data

Mar. 30, 1995 [DE] Germany .................. 195 11 663

[51] Int. Cl.⁷ ............................................ B32B 17/00
[52] U.S. Cl. .................... 428/432; 428/701; 428/702; 501/127; 501/152; 359/642; 359/831; 359/838
[58] Field of Search .................... 428/432, 701, 428/702, 700; 501/126, 127, 152; 359/642, 643, 831, 833, 838, 884

[56] References Cited

U.S. PATENT DOCUMENTS

| | | | |
|---|---|---|---|
| 4,166,831 | 9/1979 | Rhodes et al. | 264/1 |
| 4,797,282 | 1/1989 | Wahlig et al. | 424/422 |
| 5,157,547 | 10/1992 | Paesold | 359/581 |
| 5,484,752 | 1/1996 | Waku et al. | 501/152 |

FOREIGN PATENT DOCUMENTS

| | | |
|---|---|---|
| 208549 | 1/1987 | European Pat. Off. . |
| 1349259 | 4/1974 | United Kingdom . |

OTHER PUBLICATIONS

Derwent Abstract of JP 54 029 380 (Sep. 22, 1979).
Pawlewicz et al., "High Band Gap Oxide Optical Coatings for 0.25 and 1.06 μm Fusion Lasers", Thin Solid Films, 73, (1980) pp. 169–175.

*Primary Examiner*—Timothy M. Speer
*Attorney, Agent, or Firm*—Millen, White, Zelano & Branigan, P.C.

[57] ABSTRACT

The invention relates-to optical coatings of medium refractive index, having refractive index values of about 1.6 to 1.9, which can be obtained by vapor deposition of vapor-deposition materials having a chemical composition corresponding to the formula I $$YAl_xO_z \qquad \qquad I$$

wherein
  x=0.5 to 5, and
  z=3/2·(1+x) on optical substrates.

12 Claims, No Drawings

OPTICAL COATINGS OF MEDIUM REFRACTIVE INDEX

BACKGROUND OF THE INVENTION

Thin oxide coatings are widely used in industry, in particular in optics, as protective coatings or for optical functional purposes. For example, they can serve as protection against corrosion and mechanical damage or for coating the surfaces of optical components and instruments, in particular lenses, mirrors, prisms, etc. Thin oxide coatings are furthermore used to produce optical coatings of high, medium and low refractive index for increasing or reducing reflection. The principal areas of application are the production of antireflection coatings on optical substrates such as spectacle lenses, elements for camera lenses, binoculars and optical components for optical measuring instruments and laser technology. Other areas are the production of coating, having a certain refractive index and/or certain optical absorption properties, for example in interference mirrors, beam splitters, heat filters and diathermic mirrors.

Starting materials for the production of oxide coatings of this type are known per se. Usual materials are $SiO_2$ and a wide range of metal oxides, if desired in combination with one another. The choice is made essentially empirically depending on the target optical properties and the processing properties. The coatings are produced by the vacuum vapor deposition method, which is known per se. For an exemplary illustration, reference is made here to German Patent 12 28 489, which describes the materials which can be used, the processing methodology and the problems which occur in this connection.

For the production of coatings of medium refractive index, i.e., coatings having optical refractive index values of about 1.6 to 1.9 (at a wavelength of 500 nm), the range of starting materials which are suitable in principle is limited. Suitable starting materials are essentially the oxides of aluminum, magnesium, yttrium, lanthanum, praseodymium, and also cerium fluoride and lanthanum fluoride, and mixtures thereof.

However, these materials which are suitable per se have a number of disadvantages which become particularly noticeable from a practical point of view during processing.

One aspect here is that these substances have high melting and boiling points, which in addition are relatively close to one another. From a practical point of view, however, it is important that the vapor-deposition materials have melted fully before significant evaporation begins. Only then is a uniform and adequate evaporation rate ensured. This is necessary so that homogeneous coatings of uniform thickness form on the objects to be coated. However, this is not the case under practical use conditions for the oxides of magnesium and yttrium, which melt only incompletely, or not at all, under usual working conditions. They are overall difficult to evaporate, and coatings having variations in thickness are-obtained.

It is therefore desired to lower the melting points of the base materials by means of suitable additives. Additives also serve to vary and set the refractive index in the resultant coating within certain limits in a specific manner.

The choice of suitable additives for these purposes is restricted by the requirement for freedom from absorption. The only metal oxides suitable as appropriate additives are therefore those which do not absorb in the near infrared and in the visible spectral region as far as the near UV wavelength region (approx. up to 200 nm).

The use of oxide mixtures is undesired per se in vacuum vapor deposition technology. The reason is that mixtures generally evaporate incongruently, i e. they change their composition during the evaporation process, and the composition of the deposited coatings and thus their refractive index changes correspondingly. Typical examples thereof are tantalum oxide/aluminum oxide or hafnium oxide/aluminum oxide mixed systems.

SUMMARY OF THE INVENTION

The invention has as an object of finding vapordeposition materials for the production of optical coatings of medium refractive index by the vacuum vapor deposition technique, which materials do not have the disadvantages of the known materials and with which, in particular, uniform coatings of homogeneous composition which do not absorb in the visible region can be produced.

Upon further study of the specification and appended claims, further objects and advantages of this invention will become apparent to those skilled in the art.

Surprisingly, it has now been found that vapordeposition materials having a chemical composition corresponding to the formula I

$$YAl_xO_z \qquad (I)$$

where $x=0.5$ to 5 and $z=\frac{3}{2}\cdot(1+x)$ are highly suitable for the production of optical coatings of medium refractive index, having refractive index values of about 1.6 to 1.9, by vacuum vapor deposition on optical substrates. It has been found that these materials can be evaporated easily and without spitting in vacuo and readily give homogeneous, absorption-free, stable coatings of the desired refractive index under the usual working conditions in vacuum vapor deposition technology.

The invention thus relates to the use of vapor-deposition materials having a chemical composition corresponding to the formula I for the production of optical coatings of medium refractive index, having refractive index values of about 1.6 to 1.9 at a value of 500 nm, by vacuum vapor deposition coating of optical substrates.

The invention furthermore relates to a process for the production of optical coatings of medium refractive index in which optical substrates are coated with these vapor-deposition materials by vacuum vapor deposition.

The novel vapor-deposition materials are not mixtures of the two oxides, but mixed oxide compounds having a discrete, stoichiometrically defined composition. The molar ratio of yttrium oxide to aluminum oxide in these compounds is about 2:1 to 1:5. The oxygen content is in each case stoichiometric.

With the novel materials, no oxygen is released during vacuum evaporation. Under the usual working conditions in vacuum vapor deposition technology, absorption-free coatings readily form. It has also been found here that the optical properties of the resultant coatings are virtually unaffected by variations in the residual oxygen pressure during vacuum vapor deposition. These findings are particularly surprising and unforeseeable.

The novel vapor-deposition materials can be obtained by mixing yttrium oxide ($Y_2O_3$) and aluminum oxide ($Al_2O_3$) in a molar ratio of from 2:1 to 1:5, and sintering the mixture in an oxygen-containing atmosphere (e.g., air) at below the melting point. A preparation process of this type for the novel vapor-deposition materials is likewise covered by the invention. Preferred sintering temperatures are 1200 to 1700° C., preferred times are 2 to 24 hours. Sintering is conducted for a time and at a temperature sufficient to cause reaction of the individual metal oxides to produce a mixed oxide. The sintered products are in the form of hard, grey to white particles, melt completely from a temperature of approx. 1600–1700° C. and can be evaporated at temperatures between 1800° C. and 1900° C. in a vacuum of approx. $10^{-4}$ mbar.

Typical novel vapor-deposition materials have a chemical composition conforming to $Y_4Al_2O_9$ ($Y_2O_3$:$Al_2O_3$ molar ratio=2:1), $Y_3Al_5O_{12}$ (3:5), $Y_2Al_4O_9$ (1:2) and $YAl_5O_9$ (1:5).

The novel vapor-deposition materials can be employed in a known manner and under the conventional processing conditions in the vacuum apparatuses and units conventional in the relevant art. The vacuum vapor deposition can be only by thermal evaporation but also electron-beam evaporation.

The novel materials allow the production, on any suitable substrates, of homogeneous, thin coatings of uniform thickness and good adhesion which are particularly resistant to mechanical and chemical influences. The coatings have a medium refractive index which, depending on the wavelength at which the measurement is carried out, is about 1.6 to 1.9.

The coatings have high transmission in a wavelength range from the near UV (from about 200 nm) through the visible region as far as the near IR (approx. 7000 nm) and are free from absorption, in particular in the visible wavelength region.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German application No. P 195 11 663.1, filed Mar. 30, 1995 is hereby incorporated by reference.

EXAMPLES

Example 1

A powder mixture is prepared from 42.9% by weight of yttrium(III) oxide and 57.1% by weight of aluminum(III) oxide (molar ratio 1:3) and this mixture is granulated. The composition is selected so that a compound of the formula $YAl_3O_6$ forms.

The granules are sintered for 5 hours in an air atmosphere at a temperature of 1645° C. The resultant product has a melting point of about 1700° C.

Example 2

A powder mixture is prepared from 57.1% by weight of yttrium(III) oxide and 42.9% by weight of aluminum(III) oxide (molar ratio 3:5) and this mixture is granulated. The composition is selected so that a compound of the formula $Y_3Al_5O_{12}$ forms.

The granules are sintered for 5 hours in an air atmosphere at a temperature of 1645° C. The resultant product has a melting point of about 1700° C.

Example 3: Use

The granules from Example 1 are placed in a copper evaporation crucible and introduced into a commercially available vacuum vapor deposition apparatus with electron-beam evaporation.

The substrate to be deposition-coated comprises quartz or glass.

The coating is carried out at a temperature of 1800–1900° C. and a residual $O_2$ pressure of $2\times10^{-4}$ mbar at a substrate temperature of 150° C. and at a deposition rate of 0.4 nm/sec until a coating thickness of 360 nm has been achieved.

The coating has a refractive index of n=1.58 at 500 nm. The coating exhibits no absorption in the visible region and up to a wavelength of approx. 200 nm.

Analogous processing of the granules from Example 2 gives a coating having a refractive index of n=1.62 at 500 nm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A vapor-deposition material comprising a mixed oxide having a compositional formula I prior to deposition on a substrate:

$$YAl_xO_z \qquad (I)$$

wherein x=0.5 to 5, and z=3/2·(1+x), with the proviso that said material is not $Y_3Al_5O_{12}$.

2. A material according to claim 1, of the formula $Y_4Al_2O_9$, $Y_2Al_4O_9$ or $YAl_5O_9$.

3. A process for the production of an optical coating of a refractive index value of about 1.6 to 1.9, comprising vapor-deposition coating an optical substrate with a material having a chemical composition of formula I according to claim 1.

4. A process for the preparation of a vapor-deposition material having a chemical composition of formula I according to claim 1, comprising mixing $Y_2O_3$ and $Al_2O_3$ in a molar ratio of 2:1 to 1:5, and sintering the mixture in an air atmosphere at below the melting point thereof.

5. An optical material comprising an optical substrate and coated thereon a mixed oxide compound of formula (I)

$$YAl_xO_z \qquad (I)$$

wherein x=0.5 to 5, and z=3/2·(1+x), with the proviso that said material is not $Y_3Al_5O_{12}$ or $Y_2Al_4O_9$.

6. An optical material according to claim 5, wherein the compound of formula I forms an optical coating having a refractive index value of about 1.6 to 1.9.

7. An optical material according to claim 5, wherein the compound of formula I is $Y_4Al_2O_9$, $Y_3Al_5O_{12}$, $Y_2Al_4O_9$ or $YAl_5O_9$.

8. An optical material according to claim 5, wherein the substrate is a lens, mirror or prism.

9. An optical material according to claim 5, wherein the substrate is a camera lens, spectacle lens, binocular lens, interference mirror, beam splitter, heat filter or diathermic mirror.

10. A optical substrate, having thereon an optical coating of a refractive index value of about 1.6 to 1.9, produced by vacuum vapor deposition of a mixed oxide compound having, prior to deposition on the substrate, formula I $$YAl_xO_z \qquad (I)$$

wherein x=0.5 to 5, and z=3/2·(1+x).

11. A vapor-deposition material having a compositional formula I $$YAl_xO_z \qquad (I)$$

wherein x=0.5 to 5, and z=3/2·(1+x), with the proviso that said material is not $Y_3Al_5O_{12}$ or $Y_2Al_4O_9$.

12. A vapor-deposition material having a compositional formula I, prior to deposition:

$$YAl_xO_z \qquad (I)$$

wherein x=0.5 to 5, and z=3/2·(1+x), with the proviso that said material is not $Y_3Al_5O_{12}$, prepared by a process comprising mixing $Y_2O_3$ and $Al_2O_3$ in a molar ratio of 2:1 to 1:5, and sintering the mixture in an air atmosphere at below the melting point thereof, whereby a mixed oxide is formed.

* * * * *